United States Patent [19]

Kahn

[11] Patent Number: 4,724,986
[45] Date of Patent: Feb. 16, 1988

[54] BEVERAGE RECEPTACLE HOLDER FOR USE IN VEHICLES

[75] Inventor: William L. Kahn, Leawood, Kans.

[73] Assignee: Unique Products, Inc., Leawood, Kans.

[21] Appl. No.: 866,288

[22] Filed: May 23, 1986

[51] Int. Cl.⁴ .............................................. B60R 7/00
[52] U.S. Cl. ................................. 224/42.42; 224/273; 224/42.45 R
[58] Field of Search ............. 224/273, 42.42, 42.45 R; 296/37.8

[56] References Cited

U.S. PATENT DOCUMENTS

| | | | |
|---|---|---|---|
| 2,518,538 | 8/1950 | Giblin | 224/42.45 R |
| 2,574,250 | 11/1951 | Dalton | 224/42.45 R |
| 2,772,934 | 12/1956 | Eraut | 224/42.45 R |
| 3,063,569 | 11/1962 | Huber | 211/89 |
| 3,423,571 | 1/1969 | Trachtenberg et al. | 224/42.42 X |
| 3,842,981 | 10/1974 | Lambert | 224/42.45 R X |
| 4,294,384 | 10/1981 | Howell | 224/42.42 |
| 4,303,109 | 12/1981 | Cohen | 224/273 X |
| 4,535,923 | 8/1985 | Manke | 224/42.45 R X |

Primary Examiner—Henry J. Recla
Assistant Examiner—Robert M. Petrik
Attorney, Agent, or Firm—Schmidt, Johnson, Hovey & Williams

[57] ABSTRACT

A beverage receptacle holder for mounting in the interior of a passenger vehicle and which serves to securely hold a beverage receptacle such as a coffee cup, soft drink can, or the like within convenient reach of the vehicle driver or passenger. The holder includes a receptacle receiver having a plurality of spaced-apart, flexible, receptacle-engaging fingers which extend inwardly from the receiver sidewall; a positioning member adjustably coupled to the receiver and adapted for coupling to the vehicles's cigarette lighter socket; and a threaded, stabilizing element coupled to the receiver normal to the axis thereof and adapted for contact with the vehicle dashboard.

6 Claims, 8 Drawing Figures

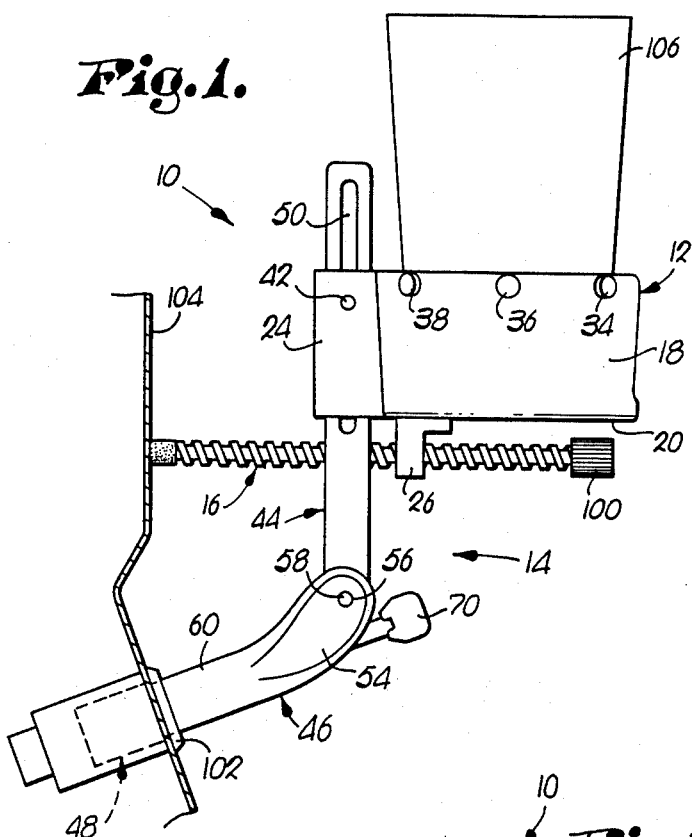
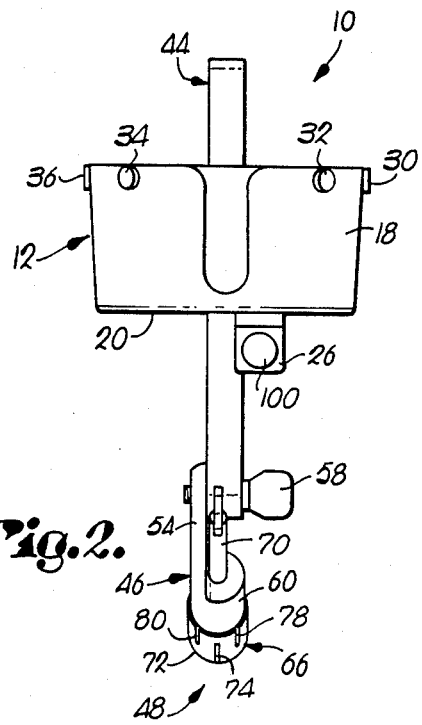
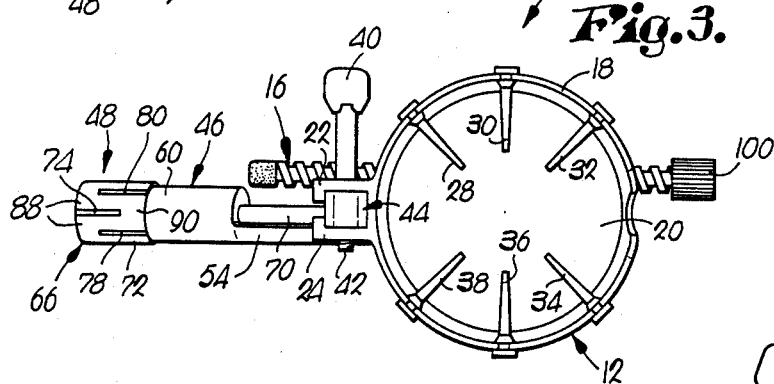
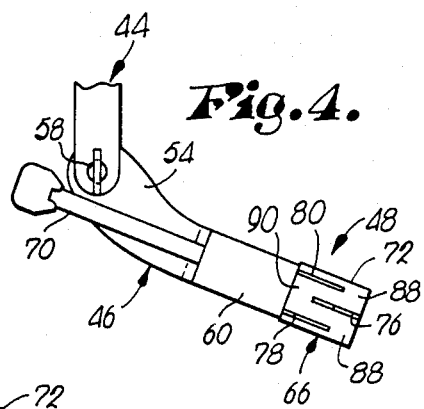
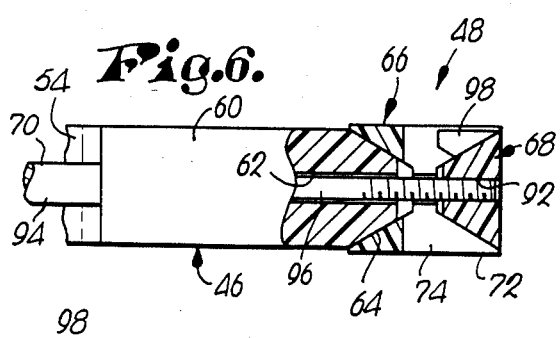
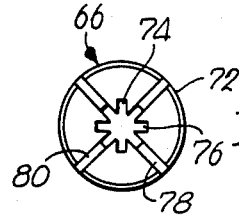
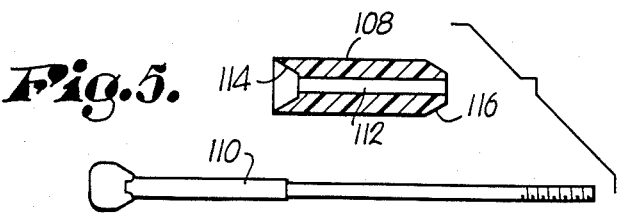

BEVERAGE RECEPTACLE HOLDER FOR USE IN VEHICLES

BACKGROUND OF THE INVENTION

1. Field of the Invention

The invention relates to a holder for use in vehicles for holding beverage receptacles such as coffee cups, mugs, tumblers, or soft drink cans. The holder has positioning means which locks into a cigarette lighter socket and a stabilizing element which abuts the dashboard of the vehicle to stabilize the holder. The holder has a cylindrical, open-topped receiver with radially positioned inwardly extending, flexible fingers coupled to the receiver sidewall which fingers allow the holder to accommodate and snugly hold receptacles of varying diameter.

2. Description of the Prior Art

Many motorists wish to drink beverages while driving in a motor vehicle. Most, if not all, motor vehicle interiors are particularly unsuited for accommodating a beverage receptacle such as a coffee cup, tumbler, or soft drink can. Generally, no flat, level surface exists within convenient arm reach of the driver or front seat passenger which will accommodate the various types of beverage receptacles in common usage.

In some vehicles, the top surfaces of the dashboard is flat and nearly level enough to support a receptacle, but the inward slant of the windshield prevents placement thereon of most receptacles, especially the taller ones, such as tumblers or soft drink cans. Those vehicle dashboard tops which are able to accept a beverage receptacle do not provide a stabilizing means for the receptacle with the result that the receptacle may fall off the dashboard upon vehicle acceleration or slide to one side or the other when the vehicle rounds a turn. The sliding of the receptacle is highly likely to cause it to fall from the dashboard and spill. Aside from the attendant mess and damage to the interior of the car if the beverage receptacle falls and spills its contents, a driver may instinctively react to prevent the spillage which removes the driver's attention from safe vehicle operation.

Some motor vehicles have a flat console area between split front seats which can accommodate a beverage receptacle. This console, however, does not prevent the receptacle from sliding around, and the location is often not particularly convenient for easy reach by the vehicle driver.

Some prior art devices have attempted to overcome these problems but with limited success. For example, one known prior art device involves a hook-shape structure with a downwardly extending shank to which is attached a cylindrical, upwardly open holder. The hook portion slides between the window of the vehicle door and the interior door frame so that the holder is suspended by the shank. This type of device is usually adapted for holding a soft drink can and will not hold most other receptacles, particularly coffee cups. Additionally, this type of holder is very inconvenient, especially to the driver, because the driver must reach across with the right hand toward the holder which is attached to the door on the left.

SUMMARY OF THE INVENTION

The problems outlined above are solved by the present invention which provides a beverage receptacle holder conveniently located for the driver or front seat passenger and which snugly holds beverage receptacles of varying diameters and shapes and which prevents the receptacle from sliding around with the attendant potential spillage associated therewith during vehicle braking, acceleration, or turning.

Broadly speaking, the holder includes a receiver with a tubular sidewall and a bottom wall which receiver is adapted for receiving and supporting a beverage receptacle therein, positioning means adapted for coupling the holder and the interior of the vehicle and for placing the holder in a position whereby the bottom wall of the receiver is substantially horizontal and opens upwardly, and a rigid stabilizing element threadably coupled to the receiver normal to the axis thereof for engaging the interior of the vehicle in order to prevent movement of the holder in a direction normal to its axis.

In preferred forms, the positioning means includes first and second members pivotably and lockably coupled, with one end of the positioning means slidably connected to the receiver, the other end of the positioning means snugly received within a vehicle cigarette lighter socket.

Additionally, the receiver preferably includes a plurality of spaced apart, flexible fingers extending radially inwardly toward the center of the chamber formed by the sidewall of the receiver; the fingers yieldably contacting the exterior wall of the receptacle placed therein. Furthermore, the preferred stabilizing element is a cylindrical member threadably coupled to the receiver; one end of the stabilizing element snugly abutting the interior portion of the vehicle to thereby stabilize the holder.

BRIEF DESCRIPTION OF THE DRAWINGS

FIG. 1 is a side elevational view of the holder installed in the interior of a vehicle;

FIG. 2 is a front elevational view of the holder;

FIG. 3 is a top plan view of the holder;

FIG. 4 is a fragmentary elevational view of a portion of the holder;

FIG. 5 is a view of an extension set for use with the holder;

FIG. 6 is a fragmentary, partially sectional view of the support structure;

FIG. 7 is a view of one end of the expansion member; and

FIG. 8 is an inner end elevation of the expansion plug.

DESCRIPTION OF THE PREFERRED EMBODIMENT

The beverage receptacle holder 10 broadly includes receiver 12, positioning member 14, and stabilizing element 16.

Receiver 12 includes cylindrical sidewall 18, circular bottom wall 20 attached to the lower end of sidewall 18, brackets 22 and 24 and stabilizing ear 26. Walls 18 and 20, brackets 22 and 24, and ear 26 are preferably composed of one-piece molded plastic.

Brackets 22,24 are each L-shaped and are mounted to the exterior of sidewall 18 with their long axes parallel to one another, with the legs of the "L" facing one another. Brackets 22,24 are spaced apart, and the short leg of the "L" is remote from sidewall 18. Brackets 22,24 are able to flex slightly toward and away from one another.

Receiver 12 also includes a clamp bolt 40 having a threaded end 42. Coaxial holes (not shown) in the sides of brackets 22 and 24 receive clamp bolt 40. The hole in bracket 24 is threaded to receive threaded end 42 of clamp bolt 40.

Stabilizing ear 26 depends from the bottom wall 20 and includes an internally threaded hole defined therethrough (not shown) the axis of which is normal to the axis of sidewall 18.

Receiver 12 also includes flexible, cylindrical, detachable fingers 28, 30, 32, 34, 36 and 38, which are spaced apart and extend radially inwardly through sidewall 18 adjacent the normally upper edge thereof. Each finger 28–38 includes a circumferentially inscribed slot defined therein which engages the walls of corresponding holes defined in sidewall 18. Fingers 28–38 are best shown in FIG. 3.

Positioning member 14 includes adjustment structure 44, support structure 46, and socket locking assembly 48. Adjustment structure 44 is rectangular in cross section and includes an elongated adjustment slot 50 parallel to the long axis thereof. The end of adjustment structure 44 which includes slot 50 is slidably received between brackets 22,24 so that clamp bolt 40 extends through slot 50. The end of adjustment structure 44 remote from slot 50 has a pivot hole (not shown) for receiving a pivot clamp screw 58.

Support structure 46 includes flat, elongated, arcuate end 54 having a threaded clamp screw receiving hole 46 therethrough which threadably receives the threaded end of pivot clamp screw 58. Pivot clamp screw 58 also extends through the pivot hole in the end of adjustment structure 44 thereby pivotally coupling structures 44 and 46. Cylindrical end 60 of structure 46 includes an axial hole 62 therethrough. End 60 and opposite end 54 of structure 46 are so coupled that the body of end 54 is offset from axial hole 62. Tip 64 of end 60 is circumferentially beveled as best shown in FIG. 6.

Socket locking assembly 48 includes expansion member 66, expander plug 68, and tension bolt 70. Expansion member 66 is comprised of a cylindrical body 72 having internal frustoconical surfaces in opposite ends thereof as shown in FIG. 6. The outer end of body 72 has perpendicular slots 74 and 76 through the longitudinal axis of the cylindrical body 72. The inner end of cylindrical body 72 also has similar slots 78 and 80 that are rotationly offset from slots 74 and 76 as shown in FIGS. 4 and 7. The slots 74,76 and 78,80 extend approximately two-thirds the length of the cylindrical body 72 from their respective ends. The areas of the cylindrical body 72 between the slots 74,76 and 78,80 form a plurality of expansion areas 88,90 respectively. Each expansion area 88,90 has a cylindrical outer surface and a conical area on its inner surface.

The expansion member 66, as described above, matingly receives the tip 64 of cylindrical end 60 of support structure 46.

Frustoconically shaped expander plug 68 includes threaded axial hole 92 therethrough. Expander plug 68 is matingly received in the end of expansion member 66 opposed to tip 64 so that threaded axial hole 92 and central axial hole 62 are aligned.

Tension bolt 70 includes larger diameter end 94, which diameter is larger than diameter of central axial hole 62, and threaded smaller diameter end 96. Smaller diameter end 96 is received through central axial hole 62 and threadingly received in threaded axial hole 92 of expander plug 68.

Expander plug 68 includes an interal tab 98 on its frustoconical surface radially extending and parallel to the axis thereof. Tab 98 is slidably received in slot 74 of expansion member 66.

Stabilizing element 16 is a threaded, elongated rod which is threadably received through ear 26. One end of element 16 includes knob 100, and the opposite end receives a resilient, surface-engaging bumper.

To attach holder 10 to the interior of a car, the user first removes the cigarette lighter from the dashboard of the vehicle leaving the open socket 102 thereby exposed. The user then inserts socket-locking assembly 48 into socket 102.

The user then rotates tension bolt 70 clockwise which causes expander plug 68 to move axially toward end 94 of tension bolt 70. Further rotation of tension bolt 70 causes expansion member 66 to be compressed between tip 64 and plug 68. This compression causes expansion areas 88,90 to move outwardly by virtue of the sliding, frustoconical surfaces of tip 64 and plug 68. As expansion areas 88,90 move outwardly, they eventually abut the walls of socket 102 to thereby firmly seat socket-locking assembly 48 within socket 102 which also firmly positions support structure 46.

The user next rotates adjustment structure 44 about pivot clamp screw 58 until structure 44 is vertically oriented and then rotates pivot clamp screw 58 clockwise whereby the threads on the end of pivot clamp screw 58 engage the threads of receiving hole 56 and cause support structure 46 and adjustment structure 44 to firmly abut one another to prevent further rotational movement about pivot clamp screw 58.

The user then slides receiver 12 up or down along slot 50 of adjustment structure 44 to locate receiver 12 at a convenient height. Clamp bolt 40 is then turned clockwise which, by virtue of the threads on end 42 engaging the threaded hole of bracket 24, causes the two brackets to "squeeze" adjustment structure therebetween to hold receiver 12 in desired position.

Knob 100 of stabilizing element 16 is then rotated clockwise until the bumper end of element 16, remote from knob 100, snugly abuts a vertical surface of the vehicle dashboard 104.

With holder 10 thus installed, receiver 12 is held firmly in place by the junction of element 16 with ear 26, the junction of adjustment structure 44 with brackets 22,24, and the junction of socket-locking assembly 48 with socket 102.

The user is now free to insert a beverage receptacle 106 into receiver 12. As receptacle 106 is placed, fingers 28–38 bend downwardly to allow the placement of receptacle 106. However, fingers 28–38, while flexible, do offer resistance, which resistance inhibits movement of receptacle 106 along the plan of bottom wall 20. Fingers 28–38 extend inwardly far enough to engage the sides of any receptacle 106 commonly used, such as a coffee cup, soft drink can, tumbler, or soft drink bottle. The handle of a coffee cup may be received within a slot formed in sidewall 18 as shown in FIG. 2.

In nearly all vehicles equipped with a cigarette lighter, the cigarette lighter is located convenient to the driver or other front seat passenger. The position of holder 10 is even more convenient because the height can be adjusted to suit the convenience of the user and receiver 12 stands apart and in front of dashboard 104.

In some motor vehicles, the cigarette lighter socket is located very low relative to the top of dashboard 104. With such socket 102 locations, it may be desirable to lengthen support structure 46 to enable to installation of holder 10 to present receiver 12 in a more convenient location. For such installations, an "extension set" (FIG. 5) is provided which includes extension unit 108 and extension bolt 110. Cylindrical extension unit 108 includes central axial hole 112 therethrough. One end of unit 108 has an inverted, frustoconical shape adapted to matingly receive tip 64. The other end of unit 108 is beveled the same as tip 64. Bolt 110 is identical to bolt 70 except that bolt 110 has an additional length equal to the length of unit 108.

In the use of the extension set, unit 108 is placed between tip 64 and expansion member 66 and thereby functions as an extension of end 60. Bolt 110 replaces bolt 70 and is used in the same manner. With the extension set, support structure 46 is effectively lengthened so that holder 10 can be effectively used with remotely located cigarette lighter sockets.

One skilled in the art will appreciate that many variations in the structure and materials described herein are possible and which still fall within the contemplation of the present invention. For example, the preferred embodiment uses molded, one-piece plastic to form sidewall 18, bottom wall 20, brackets 22,24, and ear 26. These components could be formed separately and joined together or the entire grouping formed entirely of metal as might be a designer's choice. Additionally, for example, clamp bolt 40 causes brackets 22,24 to secure support structure 44 therebetween; an adjustable ratchet mechanism could be used to maintain the adjusted height of receiver 12 instead of the specific mechanical linkage herein described.

Having described the preferred embodiment of the present invention, what is claimed and desired to be secured by Letters Patent is:

1. A holder for receiving and supporting a beverage receptacle and adapted for attachment to an interior portion of the passenger compartment of a vehicle, said holder comprising:
    a receiver for receiving and supporting a beverage receptacle therein;
    rigid, adjustable positioning means adapted for coupling between said receiver and the interior portion of the vehicle for supporting said receiver in a position whereby said receiver is substantially horizontal;
    a stabilizing element adapted for coupling between said receiver and the interior portion of the vehicle for preventing movement of said receiver in a direction normal to said receiver's axis,
    the interior portion of the vehicle having a cigarette lighter socket defined therein, said cigarette lighter socket having interior walls, said positioning means including means engaging the interior socket walls to thereby couple said positioning means to the interior portion of the vehicle.

2. A holder as set forth in claim 1, said engaging means including radially movable, circumferential walls adapted for snug contact with the interior walls of said socket and including means for moving said circumferential walls into snug contact with the interior walls of the socket.

3. A holder as set forth in claim 2, said positioning means including first and second members, said members each including first and second ends, and means for lockably and pivotably coupling said first ends, said socket-engaging means being at the second end of said second member.

4. A holder as set forth in claim 3, said receiver including means adapted for slidably and lockably coupling said receiver with the second end of said first member.

5. A holder as set forth in claim 1, said receiver including a sidewall and a bottom wall, said sidewall including a plurality of spaced-apart, flexible fingers extending radially inwardly therefrom toward the center of said receiver, said fingers being adapted for flexing toward said bottom wall when a beverage receptacle is placed within said receiver and for contacting the sidewalls of the receptacle to thereby yieldably hold the receptacle in an axially coincident position relative to said receiver.

6. A holder as set forth in claim 4, said stabilizing element being cylindrical and having first and second ends, said element having screw threads defined on the surface thereof, said receiver including means for rotatably and threadably receiving said element so that the axis of said element is substantially normal to the axis of said receiver, said first end of said element being adapted for abutting contact with the interior portion of the vehicle.

* * * * *